Patented July 25, 1933

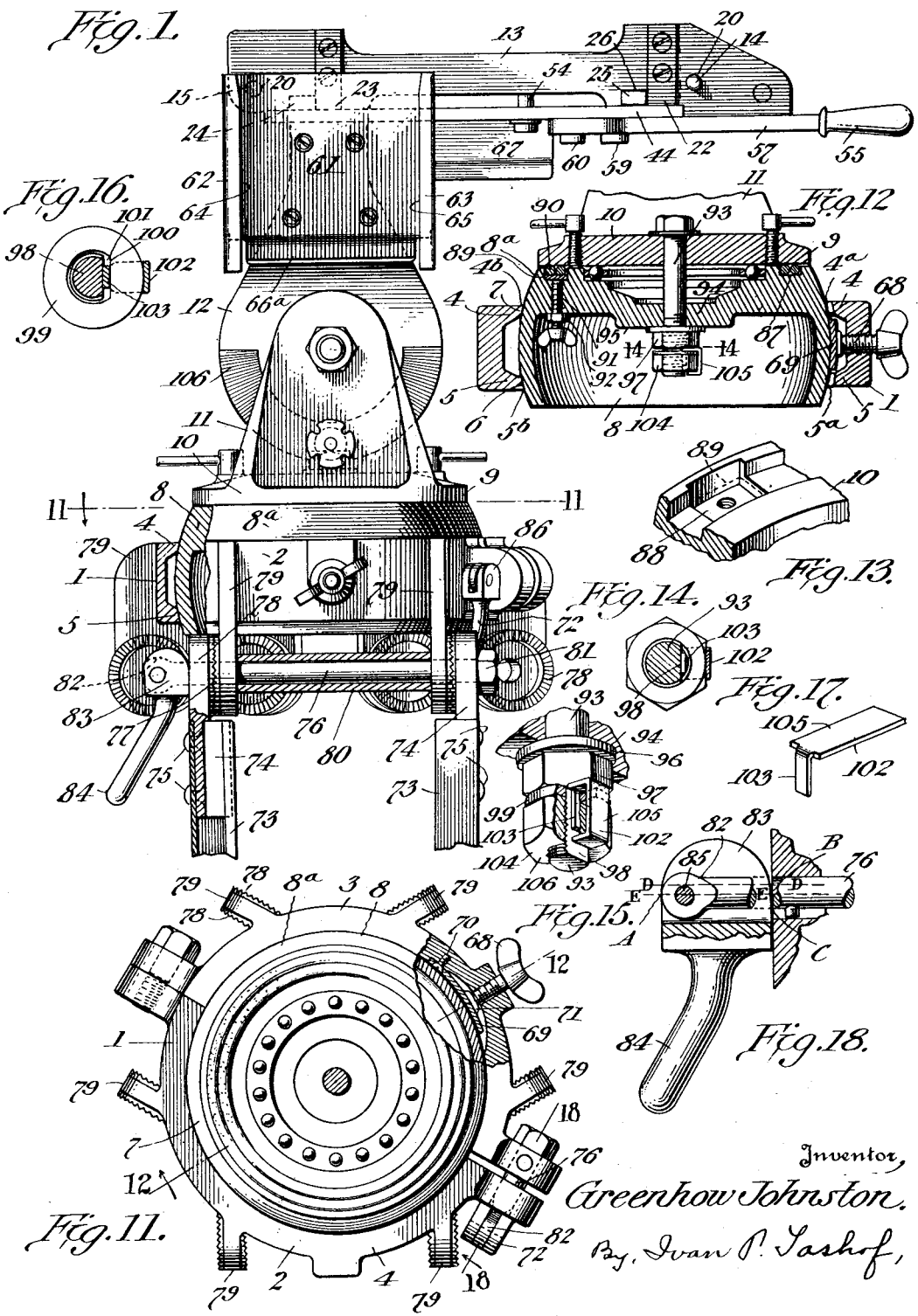

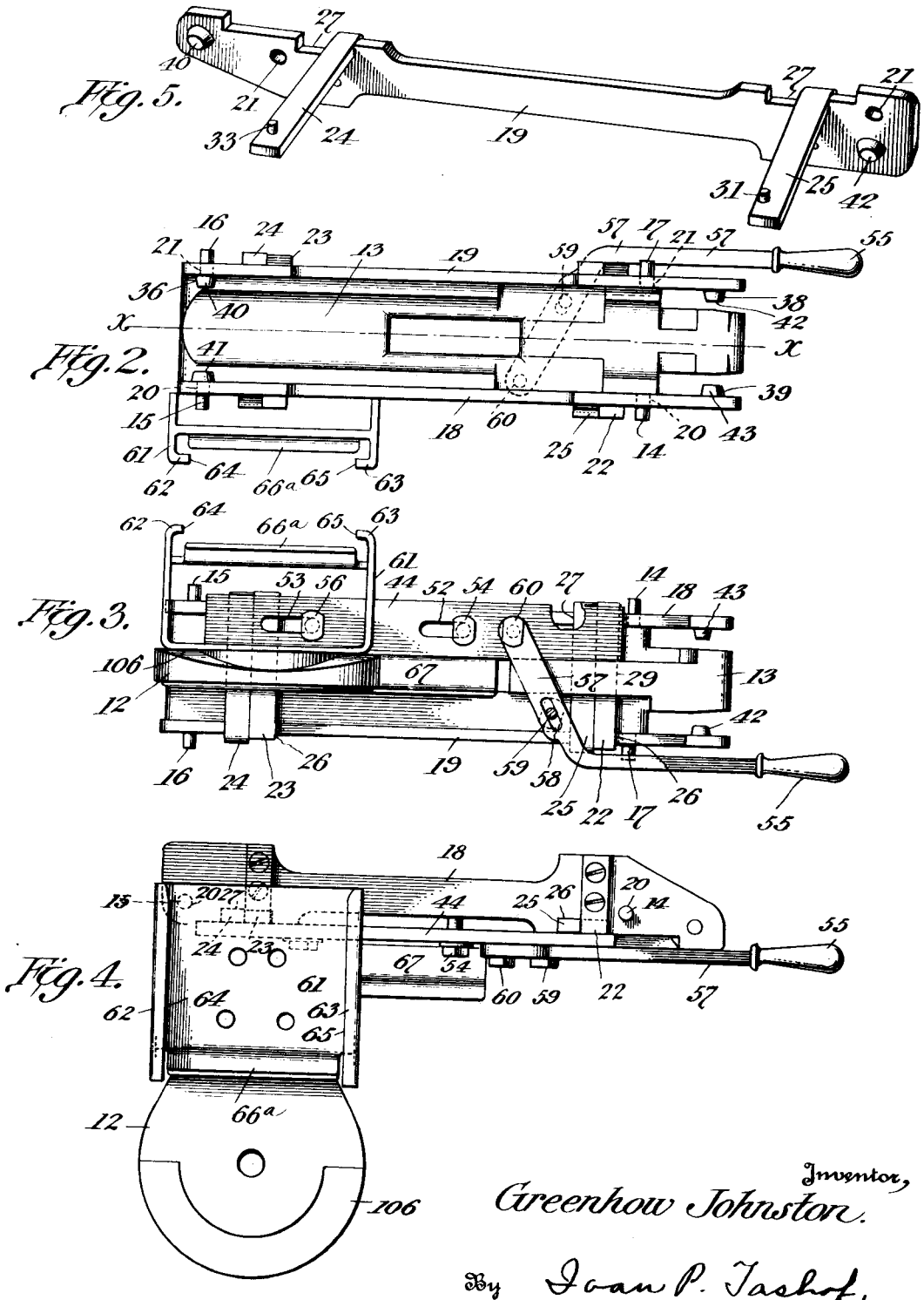

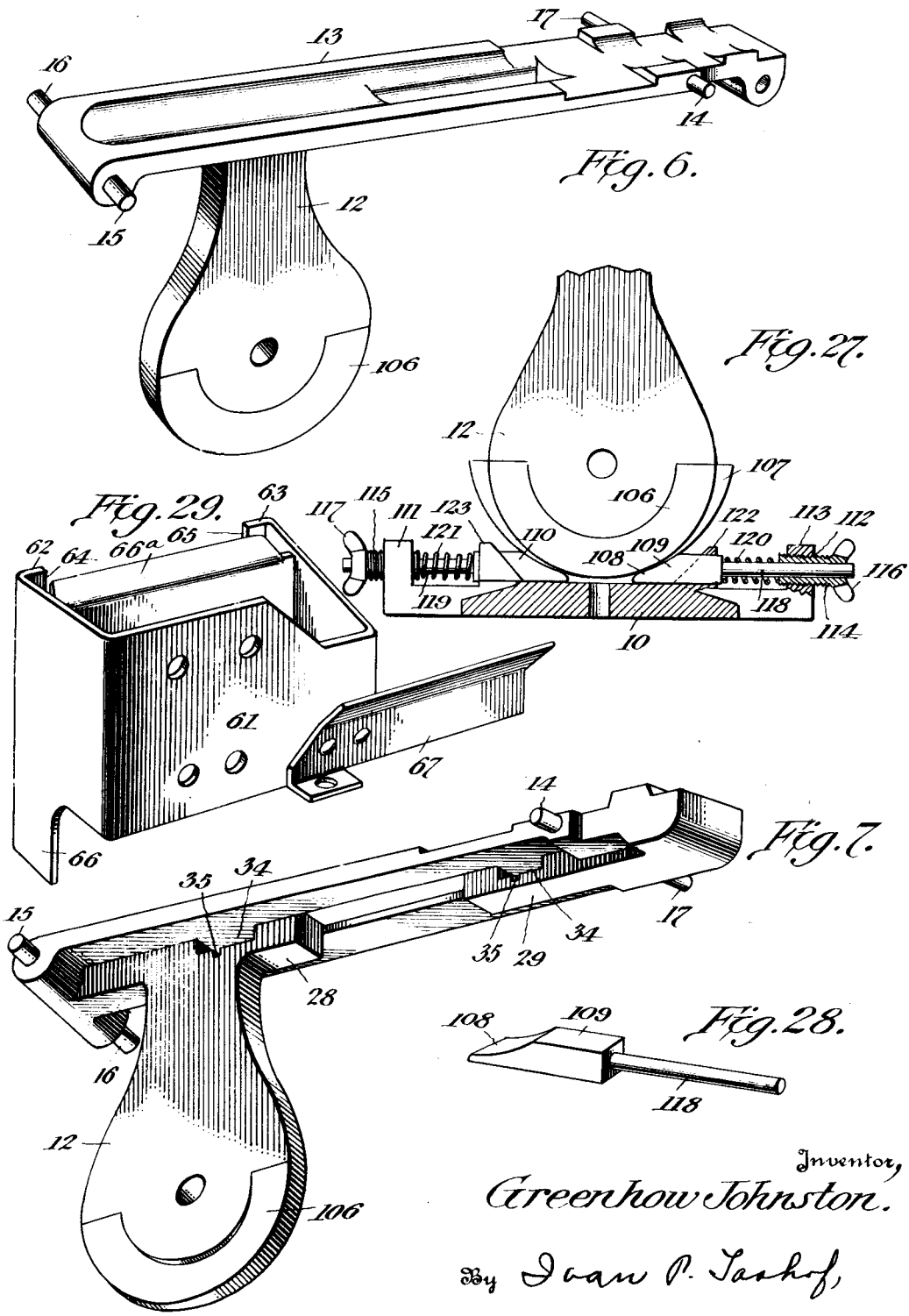

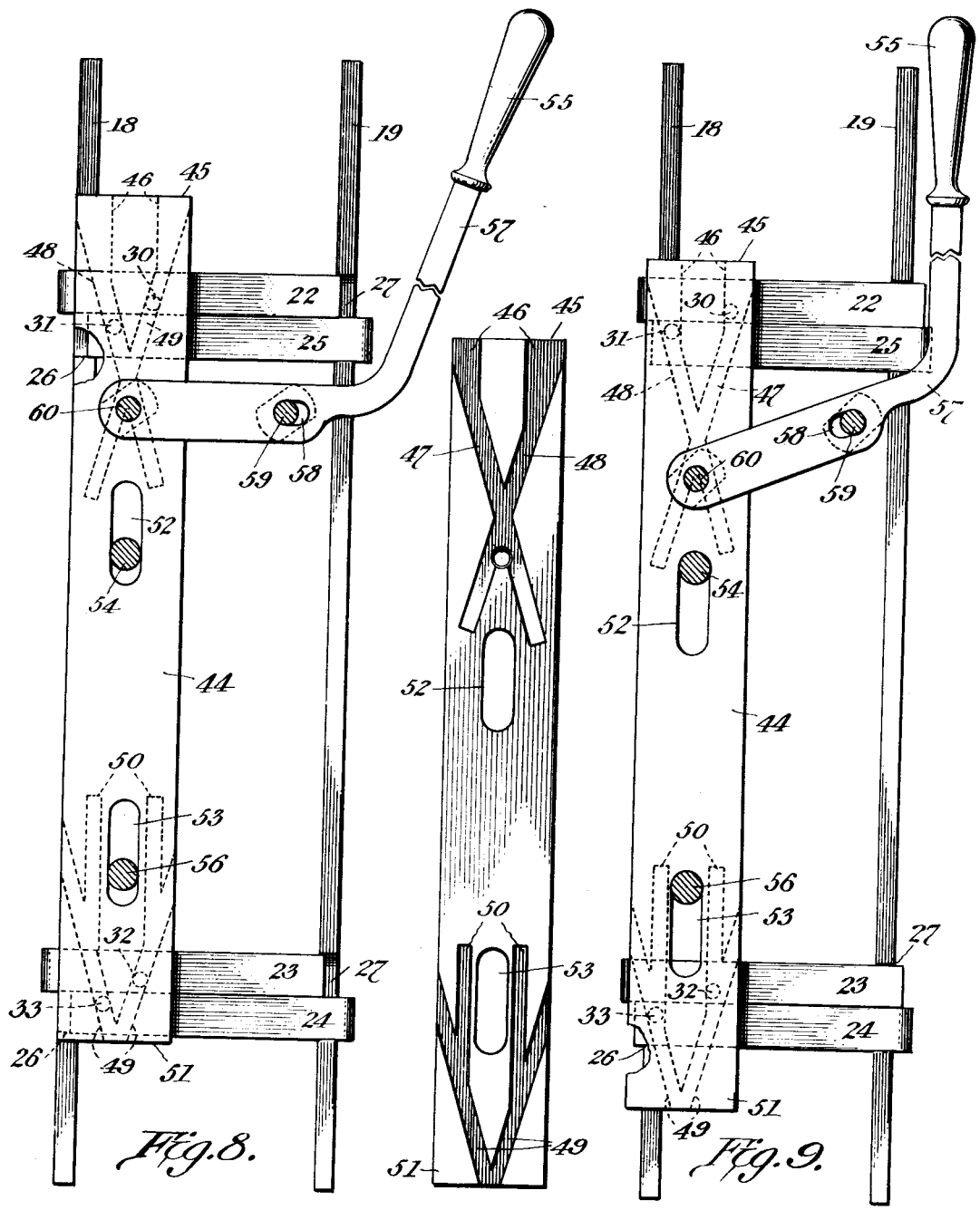

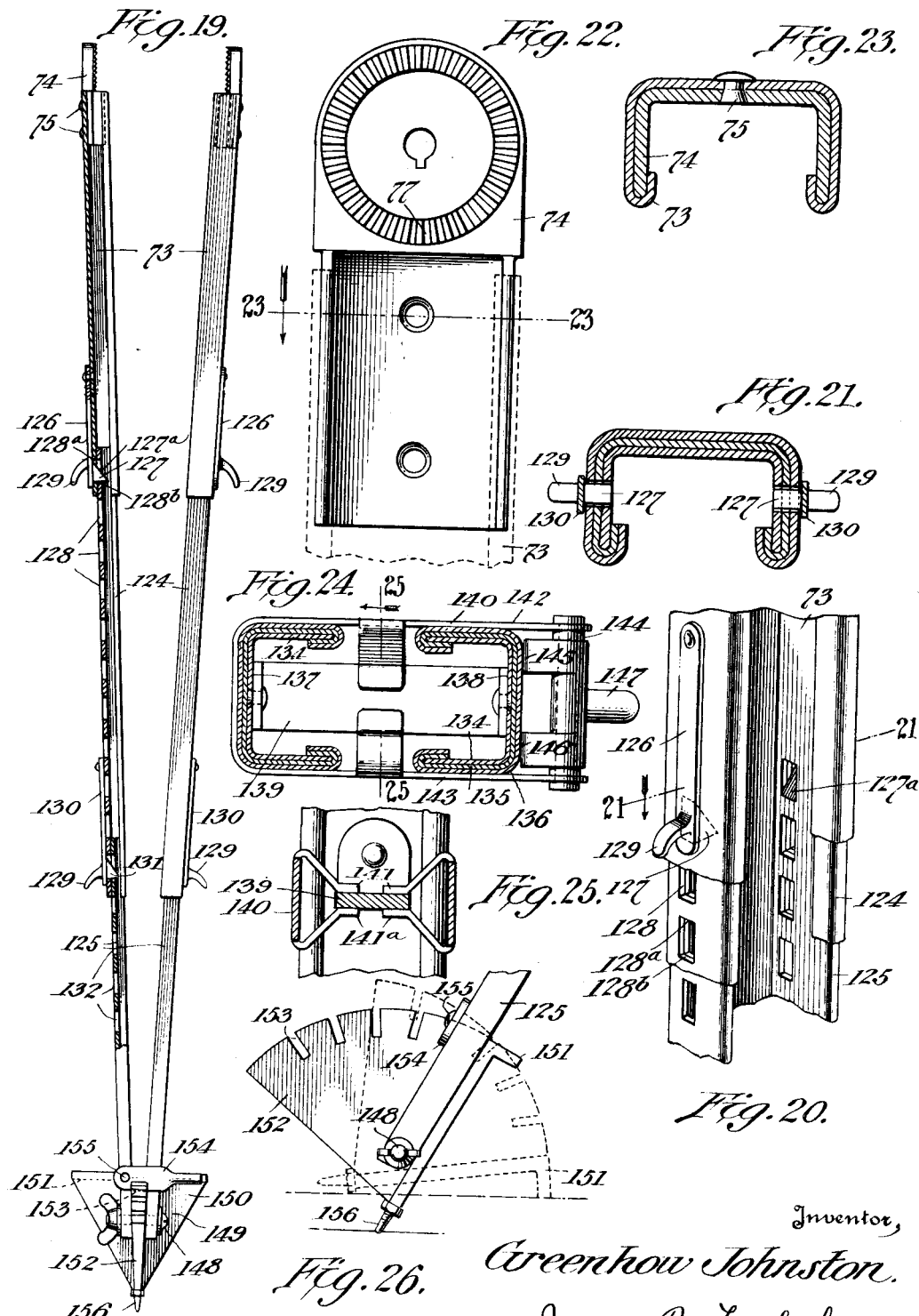

1,919,223

UNITED STATES PATENT OFFICE

GREENHOW JOHNSTON, OF GLEN ALLEN, VIRGINIA, ASSIGNOR OF ONE-HALF TO GREENHOW MAURY, JR., OF RICHMOND, VIRGINIA

MACHINE GUN MOUNT AND LOCKING DEVICE THEREFOR

Application filed April 10, 1931. Serial No. 529,216.

The present invention relates to locking devices, and more particularly to locking devices and locking clamps adapted to be used in tripods for securely clamping and locking an instrument to the tripod seat or cradle.

The invention herein disclosed is particularly of value in locking a machine gun to the cradle upon which it is positioned. It may be pointed out that when a machine gun is fired there is a tremendous recoil which has a tendency to unlock the locking device. In accordance with the present invention, a positive locking of a machine gun to the cradle member of the instrument carrying head is obtained. It is of tremendous importance that unlocking be prevented as the machine gun in action is automatically fired a number of time and it is obvious, for example, that when following an aeroplane the operator of the gun cannot stop to lock the gun to the cradle member while the aeroplane is being followed. Further, if the machine gun becomes loosened from the cradle member, the sight on the aeroplane is lost and inaccuracy in firing thereby results. The remarks that have been made in connection with aeroplanes are of course applicable to any moving object, such as tanks, armored motor cars, and the like.

Many attempts have been made to provide a suitable locking device having the advantages pointed out, but as far as known none of these have been successful. Most of the prior devices have been provided with springs and quick acting bolts, but such elements have not proved satisfactory.

In its broadest form, the present invention is directed to a support or cradle base forming a rest for an article to be clamped and locked thereon. Adjacent each side of the support or cradle base are cradle sides forming article clamping members movable toward and from the cradle base. Means are provided to move said cradle sides in and out of clamping positions. Preferably, the cradle sides are moved toward and from the longitudinal center line of the cradle base, while the sides are maintained in symmetrical spacing to said line. The cradle base carries guide members extending transversely thereof, and the cradle sides are slidably mounted on the guide members. Means are provided to simultaneously move the cradle side members towards each other into a clamping position, and from each other into a releasing position, said means being arranged to lock the sides releasably in clamping position. A camming device having operative connection with the cradle sides is preferably employed to effect the simultaneous movements of the sides towards and from the longitudinal center line of the cradle base.

Transverse members extending from each cradle side member are provided with projecting pins and the latter work in a cam plate having diverging pairs of cam slots, the cam plate being mounted on the cradle base for movement longitudinally thereof. It may be pointed out that a movement of the cam plate in one direction effects movement of the cradle sides towards each other to clamp the article on the cradle base and the movement of the plate in the other direction effects movement of the sides from each other to unclamp the article. The cam slots have parallel extensions forming dwells and receive the cam pins when the cradle sides are in a clamping position to thereby effect a locking action. Means are provided to move the cam plate.

The transverse members extending from each cradle side toward the other cradle side form adjacent pairs of transverse members, the cam pins projecting from each member of said pair of transverse members being offset longitudinally with respect to each other longitudinally of the cradle base. The cam plate is also provided with diverging pairs of slots to receive the cam pins. The parallel extensions continuous with said slots and forming dwells are offset to correspond with the cam pin offsets whereby upon the cam plate being moved in one direction, the sides of the cradle are preliminary brought into a camming position and, upon further movement as the cam pins enter the dwell port, into a locking position. Upon reverse movement, the cam plate is brought into an unlocking and unclamping position.

The present invention also contemplates certain novel details of combination, construction and arrangement of parts of the improved apparatus whereby certain important advantages are obtained, as will be more fully described hereinafter and pointed out in the claims, it being understood that the invention is susceptible of various changes in construction which may be made within the scope of the claims without departing from the spirit of the invention.

The present invention will be disclosed and fully explained by reference to the accompanying drawings.

Figure 1 is a side elevation of the tripod showing the instrument carrying-seat or cradle provided with a locking device;

Fig. 2 is a top plan view of the instrument carrying seat or cradle together with a locking device and a rack for holding an ammunition box adapted to supply ammunition to a gun mounted on the cradle;

Fig. 3 is a bottom plan view of the same;

Fig. 4 is a side elevation of the same;

Fig. 5 is a perspective view of the cradle side member;

Fig. 6 is a perspective top view showing the instrument cradle mounted on the instrument carrying-head;

Fig. 7 is a perspective bottom view of the same;

Fig. 8 is a bottom plan view of the locking device in its unlocked position and showing the side clamps and slide member thereof;

Fig. 9 is a similar view of the respective members of the locking device in their locked position;

Fig. 10 is a bottom plan view of the slide member;

Fig. 11 is a plan view partly in section on the line 11—11 of Fig. 1, showing an adjustable expansion nut cooperating with the lower tripod carrying-head to assist in the tightening or loosening of the same in accordance with contraction or expansion induced by atmospheric conditions;

Fig. 12 is a vertical section on the line 12—12 of Fig. 11, showing an adjustment bolt in the lower carrying-head and contacting with the friction plate positioned between the upper and lower carrying head so that the friction therebetween may be controlled;

Fig. 13 is a perspective view of a portion of the lower carrying-head, showing the friction groove recessed to receive the friction plate;

Fig. 14 is a horizontal sectional view taken on the line 14—14 of Fig. 12, showing the pin bolt cut away to receive the strap lock;

Fig. 15 is a perspective view of the locking device for assisting in locking the upper carrying-head to the lower carrying-head, the lock strap being shown in assembled relationship with the bolt, washer and nut members;

Fig. 16 is a plan view partly in section showing the bolt member cut away and positioned adjacent the lock strap;

Fig. 17 is a perspective view of the lock strap;

Fig. 18 is a vertical section taken on the line 18—18 of Fig. 11 showing an eccentric lock for locking together the lugs and arcuate members of the tripod supporting member;

Fig. 19 is a front elevation partly in section of one set of legs;

Fig. 20 is a detailed perspective view showing the retaining means for holding the leg members in different positions;

Fig. 21 is a horizontal sectional view on the line 21—21 of Fig. 20;

Fig. 22 is a side elevation of the leg casting showing its connection to the leg, the latter being shown in dotted lines;

Fig. 23 is a horizontal section on the line 23—23 of Fig. 22;

Fig. 24 is a modified form of clamp for holding the telescoping legs in rigid relation;

Fig. 25 is a transverse section taken on line 25—25 of Fig. 24;

Fig. 26 is a detail of the mud shoe shown in Fig. 19, the full line showing it used as a point support and the dotted line showing it used as a surface support for moist or soft ground;

Fig. 27 is an elevation showing auxiliary means for resisting the torque induced by the movement of the instrument carrying head;

Fig. 28 is a detail of a resistance shoe constituting one of the members of the auxiliary means set forth in Fig. 26;

Fig. 29 is an inverted perspective view of the ammunition box holder, together with a deflector for assisting in throwing the shells discharged from the machine gun;

The tripod, as shown in Fig. 1, comprises a split arcuate tripod supporting base 1 split into arcuate members 2 and 3, having upper and lower projecting ribs 4 and 5, provided with surfaces 6 and 7 respectively arcuate in shape and adapted for engagement with the outer arcuate face 8a of the lower tripod carrying head 8.

Mounted on the lower carrying head 8 for horizontal rotative movement is an upper tripod carrying head 9 provided with a supporting base 10. The standard supporting base 10 has mounted thereon an instrument carrying head supporting standard 11. Mounted on the latter is an instrument carrying head 12 having a projecting instrument seat or cradle 13.

The cradle base or seat 13 is provided with transversely extending guide members or pins 14, 15, 16 and 17 arranged in alined and oppositely projecting pairs adjacent each end of the cradle. Cradle sides 18 and 19 are each apertured at 20 and 21 to receive the pins projecting from a respective side of the cradle 13 and are thus permitted lateral movement toward and from the cradle. These cradle sides form, as will be presently explained, the clamps of the device. These cradle sides are provided with cross or transverse members 22, 23, 24 and 25, the arrangement of the cross members being such that each side carries two of the cross members and the cross members of one side are positioned beside the cross members of the other side. The free ends of the cross members are slidably mounted in recesses 26 and 27.

These cross members have cam pins 30, 31, 32 and 33 projecting downwardly from their under sides, said pins being carried respectively by the cross members 22, 23, 24 and 25. The cradle is provided on its under side with spaced and alined ribs 28 and 29 arranged along the center line x—x of the cradle base. These ribs are each provided with a slot 34 through which a pair of the cross members pass and in the bottom of each slot is a notch 35. These notches 35 are arranged to permit passage of the pins 30, 31, 32 and 33, so that the cradle sides may be readily removed in cleaning or repairing the device. When the locking device is used to lock an instrument such as a machine gun having a high recoil, pins 40, 41, 42 and 43 are provided on the side members 18 and 19 to fit into corresponding recesses in the gun. However, this construction is used merely when a machine gun or the like is mounted thereon, is one having high recoil, and therefore the pins may be eliminated under some circumstances. The pins 40 to 43 preferably have tapered surfaces 36, 37, 38 and 39 to assist in keeping the machine gun in alinement.

Cooperating with the slidable cross arms 22, 23, 24 and 25 is a slotted slidable locking plate 44, this plate also functioning to open and close the locking device. This cam plate 44 is provided with spaced and alined slots 52 and 53 wherethrough pass bolts 54 and 56 respectively which serve to hold this plate beneath the cradle base and permit it to slide longitudinally of the cradle. In the upper face of this plate 44 at the rear end 45 is provided with a pair of diagonal cam slots 47 and 48 receiving the respective pins 30 and 31 and at those ends of these slots which are furthest apart are provided parallel portions 46 forming cam dwells. Similarly, at the other end 51 of the member 44 there are provided diverging cam slots 49 receiving the pins 32 and 33 and terminating in parallel dwell portions 50. The diagonal portions of the cam slots at one end of the plate are parallel to the corresponding slot portions at the other end. It will be noted, however, that the dwell or parallel portions at each end are so arranged that one of these dwell portions has its junction with its diagonal slot offset longitudinally of the plate with respect to the other dwell portion. The reason for this will be understood when the function and operation of the plate 44 are considered. This plate forms a cam member and its function is to move the cradle sides toward and from each other and thus toward and from the cradle base or bottom. Moreover, the action of this plate is to maintain the cradle sides symmetrically positioned with respect to the center line x—x of the cradle base. Finally, it is the function of the dwell portions of the slots to lock the cradle sides in clamping position. In operation it is to be noted that the camming pins 30, 31, 32 and 33 being carried on the respective cross members are necessarily arranged in pairs with one pin of each pair offset longitudinally of the cradle with respect to the other. In order to effect the camming action to draw the cradle sides toward each other, the plate in the present arrangement is moved longitudinally to spread the pins apart. This movement of the cradle sides towards each other continues until the plate 44 has been moved to bring dwell portions to such positions as receive the pins. If the pins are to cease their lateral movement simultaneously so that the cradle sides come to rest equally spaced from the center line x—x, then they must be caused to engage the dwells simultaneously. Accordingly, since the pins are offset as above described, the dwells must also be equally offset. Obviously, the arrangement of the pins, slots and dwells may be reversed so that the dwells are at the closer ends of the slots and the pins are moved toward each other to draw the cradle sides toward each other.

In order to operate the cam plate 44, there is provided an operating lever 57 provided with a handle 55 at one end and pivoted to the cradle bottom on a bolt or pin 59 which passes through a slot 58 in said lever to allow the necessary play. The remaining end of the lever is pivoted on a bolt 60 carried by the plate 44. The arrangement of this lever is such that upon pulling the handle away from the cradle as in Fig. 8 the cam pins are engaged in the closer portions of the cam slots and the cradle sides are forced apart to release the gun. When the motion of the handle 57 is reversed, the cam pins move in the diagonal cam slots in a diverging direction towards the dwell portion, and the cradle sides are brought to a clamping position with respect to the instrument carried by the cradle. The continued motion of the handle 57 causes the cam pins to engage the dwell portions adjacent the cam slots to effectively lock the instrument on the cradle base. In other words, the arrangement of the pins and slots provides a compound movement functioning first to clamp the instrument, such as a gun, on and to the instrument seat or cradle, and then to lock it thereto in such a manner as to minimize the unlocking tendency induced by the recoil of the gun.

Suitably mounted, as for example on the carrying head 12 and adjacent to one of the side members of the locking device, is an ammunition box carrier 61 provided with slideways 62 and 63 having lips 64 and 65, the slideways receiving an ammunition box which is held in place by the flange 66 projecting from the bottom of the ammunition carrier or bracket. Mounted on the ammunition carrier or bracket 61 is a deflector 67, as shown in Fig. 29, the deflector functioning to receive and deflect exploded shells. To stop the ammunition box from sliding through the ammunition carrier 61, there is provided an offset lip 66a.

Referring to the tripod supporting base 1 and the lower tripod carrying head 8, means are provided for controlling the friction between these two members. Positioned between the projecting ribs 4 and 5 of either arcuate member 2 and 3 is a screw bolt 68 adapted to bear against a flexible friction plate 69 of any suitable material, but preferably made of a metal which will not scar such as copper. The plate 69 is removably mounted in the split arcuate member 3 by means of a screw 70 or the like, as shown in detail in Fig. 11. The bolt 68 is preferably provided with a shoe 71, the shoe riding against the friction plate 69. However, it is obvious that the shoe may be omitted and then the bolt 68 will ride against the friction plate 69. The friction plate 69 and the projecting ribs 4 and 5 of the split supporting base provide a three-point suspension for the lower tripod carrying head 8.

The function of the friction plate 69 and the bolt 68 will be clear from the following: in order to tighten the lower tripod carrying head 8 in the tripod supporting base 1, the bolt 68 is turned and the lower tripod carrying head and the split supporting base 1 having projecting ribs 4 and 5 are brought into frictional contact. After so bringing the two into frictional contact, the final tightening is obtained by the primary tightening means operated by handle 72. It is to be noted that when the bolt 68 is turned, it presses against the shoe 69 adjacent the arcuate face 8a of the lower tripod carrying head 8, and thereby provides a small clearance at the points 4a and 5a between the projecting ribs 4 and 5 and the arcuate face 8a of the lower tripod carrying head 8. At the same time the lower tripod carrying head 8 is pressed against the flanges 4 and 5 at the substantially diametrically opposed points 4b and 5b. This provides what is herein termed a three-point suspension for the carrying head 8, forces being applied at the friction shoe 69 and at the points 4b and 5b of the ribs 4 and 5.

The advantages of the arrangement set forth are first that a wedge effect is obtained; second, the expansion of the ball tripod carrying head and the other members may be taken care of, it being borne in mind that the tripod is to be used under all kinds of weather conditions. Further, if dirt gets in between the ball tripod carrying head 8 and the supporting tripod base 1, it may be easily worked out by unloosening the bolt 68.

It is to be noted that the stationary legs 73 which are preferably made of aluminum, are fixed by rivets 75 or the like to leg head members 74 pivotally mounted on a cross pin or bolt 76. The inner surface of each tripod head 74 is serrated to provide projecting teeth 77, functioning as male members which are adapted to cooperatively engage corresponding depressions or female members 78 on flanges 79, extending from the tripod supporting base 1. The cross pin 76 is positioned within a supporting member 80 to prevent the pin from springing on being tightened. The cross pin 76 is threaded at one end to receive a nut 81 and a novel locking device is provided at the other end. The pin 76 is provided at the locking end with a cam shaped head 82. Eccentrically mounted on the head is a cam-shaped locking member 83 having a handle 84. It is to be noted that the cam-shaped locking member 83 has a curved surface from the points A and B. From the point B to the point C, the surface of the locking member is straight. The lock is shown in the locked position in Fig. 18. When in this position, the lines D—D and E—E show the vertical portion of the member 83 which is adjacent to the leg member 74. This construction of the cam member 83 is an improvement over the old cam construction in which the cam had a continuous circular face. For instance, when using the tripod in connection with a machine gun mount, there is a tremendous recoil. In using the old cam locking device which had a continuous curved cam face, the recoil unloosened the lock. In the present device, by virtue of the cam being eccentrically mounted on the pin 85 and having a straight portion, as pointed out, an effective locking action is obtained. A similar locking device 86 is provided to lock the split arcuate sections 4 and 5 together.

The lower carrying head 8 mounted in the arcuate members 4 and 5 for universal movement, as shown in Figs. 12 and 13, has an upper wall provided with a circular groove 87 provided with a recess 88, having positioned therein a metal plate 89. Mounted in the entire groove 87 is a friction packing 90. The carrying head 8 is provided with a longitudinal recess, the walls of which are threaded to receive a bolt 91. The shank of the bolt carries a jam nut 92. The function of this arrangement is to bring the lower carrying head 8 in close frictional contact with the supporting base 10 of the instrument carrying head supporting standard 11 when any noticeable wear has taken place in the friction packing 90. By simply tightening the bolt 91, the desired frictional contact is obtained.

A novel locking arrangement which is in effect a double lock is provided for locking the tripod supporting base 10 to the lower tripod carrying head 8. A king bolt 93 is fixedly mounted in the tripod supporting base 10 and passes through an aperture in the upper wall 94 of the lower carrying head 8, the latter being provided with a bottom face 95. Positioned on the bolt 93 adjacent the threads 94 is a washer 96 made out of any bearing metal, but preferably brass. A fastening nut 97 is threaded on the shank of the bolt 93 adjacent the bearing plate 96. When this nut is tightened, the supporting base 10 is brought into tight engagement with the lower carrying head 8, and so effects a tightening together of the two members. A further tightening is effected by the following means. It is to be noted that the threaded portion of the bolt 93 is cut away to present a straight face 98, as shown in Figs. 15 and 16. Positioned adjacent the tightening nut 97 is a washer 99, the inner wall of which has been cut away to provide a straight portion 100, as shown in Fig. 16. The diameter of the king bolt 93 as cut away is less than the inner diameter of the bolt, as shown in Fig. 16, so that a clearance space 101 is formed between the two members. Positioned within the clearance space is a lock strip 102 having a tongue 103 projecting vertically therefrom, as shown in Fig. 14. The tongue 103 is positioned in the clearance space 101, adjacent the face 98 of the bolt 93 and the cut away portion 100 of the washer 99. After the tripod supporting base 10 and the lower carrying head 8 have been brought into tight engagement by the initial locking means, the washer 99 is put on adjacent to the locking nut 97, and then the locking nut 104 is screwed on to the shank of the bolt. Thereafter, the locking strip 102 is inserted into the clearance space 101 and the locking nut 104 is then tightened. The locking strip 102 is made of a soft metal or alloy that may be bent easily without breaking. After the projecting vertical tongue 103 of the locking strip is inserted into the clearance space 101 as described, and the locking nut 104 tightened, the portion 105 of the locking strip is bent over adjacent to the under surface 106 of the locking nut 104. This makes it impossible for the lower locking nut 104 to be unscrewed by the recoil of an instrument mounted on the tripod. In other words there is provided a positive locking engagement of the nut 104 to the bolt and by virtue thereof and the cooperating initial locking means, a tight engagement between the tripod supporting head 10 and the lower carrying head 8.

The carrying head 12 having a lower wedge-shaped portion 106 is constructed as set forth in application Serial No. 497,289, filed Nov. 21, 1930, and cooperates with variable pressure means set forth in said application, the variable pressure means being set under a predetermined pressure to hold the instrument carrying head and the instrument in set initial position. The lower wedge-shaped member is adapted to tighten itself against the variable pressure means as the instrument carrying head and instrument move from the initial set position. It has been found desirable to provide additional tightening means. As shown in Fig. 27, a shoe 107 surrounds the wedge-shaped portion 106 of the carrying head 12 which is mounted on a standard 11, as shown in Fig. 1, the standard being positioned on the carrying head supporting base 10. Mounted on the base 10 are opposing shoes 109 and 110, one of them being shown in detail in Fig. 28. The shoes are provided with wedge shaped portions 108. The supporting base 10 is provided with projecting members 111 and 113 internally threaded at 112 to cooperate with the external threads 114 and 115 of the spring tension nuts 116 and 117. These spring tension nuts hold freely the stems 118 and 119 of the shoes 109 and 110 respectively against the tension of the springs 120 and 121. The shoes 109 and 110 are provided with guards 122 and 123, these guards acting as a guide in holding the shoes in place.

As shown in Fig. 19, the tripod legs comprise stationary members 73 and telescoping sections 124 and 125. When the tripod legs are to be used to follow a rapidly moving object such as an aeroplane, it is essential that means be provided for quickly adjusting the tripod legs from a flat position close to the ground to one where they are in a more vertical position and a higher elevation from the ground. This is accomplished by the arrangement shown in Fig. 19, which shows the tripod legs somewhat spread apart and in a somewhat vertical position, the machine gun being elevated and away from the ground. Each fixed leg 73 is provided with a spring member 126, the spring member being in the shape of a projecting tongue and carrying a tooth 127 at the lower part of the tongue 126. The tooth 127 is adapted to engage a series of slots 128 in the movable telescopic leg 124, when the spring member is actuated by the handle 129. A similar spring member 130 is mounted on the telescopic leg 124 and is provided at its lower portion with a tooth 131, adapted to engage slots 132 in the telescopic member 125.

The tripod legs, as shown in Fig. 19, are in their open or extended position with the teeth 127 and 131 in engagement with slots 128 and 132. When it is desired to shorten the tripod leg and bring the legs close to the ground, the handle 129 is pulled outwardly away from the leg 73 so that its tooth 127 disengages from the slot 128. This allows the upper leg member 73 to recede and engage in any desirable slot 128 in the telescopic member 124. If the tripod legs are shortened sufficiently, it will not be necessary for the operator to use the second spring member 130 by pulling on the handle 133. However, when desired, the handle 133 may be pulled outwardly so as to disengage the tooth 131 from its respective slot 132. In this manner, many desirable results may be accomplished. When it is desired to lengthen the legs a pull is exerted on the tripod leg 73, and the teeth 127 and 131 become disengaged from their respective notches and the telescopic legs ride upwardly into the desired position. When the movement is stopped, the teeth 127 and 131 automatically, due to pressure of the springs 126 and 130, engage the desired slots. When a lifting action is exerted on the stationary leg 73, the face 127a of the tooth 127 engages the upper face 128a of the slot 128 and the tooth 127 is cammed out of engagement with the slot 128. When the tripod legs are positioned in any desired position by means of the locking teeth and their cooperating slots, the weight of the instrument carried by the tripod is sufficient to hold the teeth in locking engagement with their respective slots, the pressure induced by the weight of the instrument being transmitted through the tripod legs 73 and to the tooth 127 abutting against the lower face 128b of the slot 128. Fig. 20 shows the legs in the telescoped position. The spring members 126 and 130 are made of a metal having the proper spring tension so that the weight of the legs overbalances the tension of the spring. Means are provided for clamping cooperating legs together in a fixed position. Referring to Figs. 24 and 25, 134 is the fixed stationary leg and 135 is a movable telescopic leg. As shown in Fig. 24, there is a third telescopic member 136. However, the arrangement about to be described will work with or without the third telescopic leg member 136. Fixed to the opposing walls 137 and 138 of the stationary leg members 134 by means of rivets or the like is a spacing block 139. A clamp 140 provided with lips 141 is positioned adjacent and around the left hand telescopic member 136, as shown in Fig. 24. The side members 142 and 143 of the clamp 140 have pivotally mounted therein a cross pin 144 having cam faces 145 and 146 adapted to lock the opposing legs to each other on operation of the handle 147. The locking arrangement is identical with that shown in Fig. 18, the construction of which has been previously described. The spacing block 139 has lips 141 extending over and in engagement with the upper surface of the tension spacing block 139. A similar set of lips 141a are in engagement with the under surface of the tension spacing member 139. The function of the lips 141 and 141a is to hold the spacing member 139, the legs 134 and 136, and the camming member 140 carrying the locking means in horizontal alinement irrespective of the position of the legs.

Pivotally mounted on the tripod legs 125 by means of a pin 148 is a shoe 149, which may be used to position the tripod legs either on hard or soft ground. As shown in Fig. 19, the shoe is adapted to be placed in hard ground. The position which the shoe 149 takes when used to set the tripod upon soft ground is shown in Fig. 26.

The shoe 149 comprises a triangular or spear-shaped member 150 having a projecting flange 151, as shown in Fig. 26. Extending from the member 150 at right angles thereto is a projecting flange 152 which also functions as a locking member. The flange member 152 is provided with a series of slots 153 adapted to receive a locking plate 154, pivotally mounted on one of the legs 125 and 155. The mud shoe 149 is provided with a detachable steel point 156 which may be renewed as it wears out.

It is desired to point out while the clamping and locking device herein disclosed is of particular value in clamping and locking a machine gun on a suitable support, the device is of universal application and may be used in connection with cameras, transits and many other articles. In other words, the present device is suitable for clamping and locking an article of any kind to a supporting member.

Having thus described the invention, what I claim is:

1. A machine gun support including a cradle base forming a rest for a gun, cradle side forming non-yielding gun clamping members and movable toward and from said base, and means to move said sides into and out of clamping and locking position.

2. A machine gun support including a cradle base forming a rest for a gun, cradle sides mounted on said base to move toward each other to clamp and lock thereon a gun, and to move from each other to release the gun, and means to simultaneously move said cradle sides into non-yielding clamping and non-yielding locking positions.

3. A machine gun support including a cradle base forming a rest for a gun, cradle sides forming non-yielding gun clamping and locking members and movable laterally toward and from said base and means to simultaneously move said sides toward and from the longitudinal center line of the base while maintaining the sides in symmetrical spacing to said line.

4. A machine gun support including a cradle base forming a rest for the gun, guide members carried by the base and extending transversely thereof, cradle sides forming gun clamping and locking members slidably mounted on said guide members, and means to move said side members on said guide members into and out of gun clamping and locking positions.

5. A machine gun support including a cradle base forming a rest for the gun, guide members carried by the base and extending transversely thereof, cradle sides forming gun clamping and locking members slidably mounted on said guide members, and means connecting said side members and arranged to move them simultaneously toward each other into clamping and locking positions and from each other into releasing position.

6. A machine gun support including a cradle base forming a rest for the gun, guide members carried by the base and extending transversely thereof, cradle sides forming gun clamping members slidably mounted on said guide members, and means connecting said side members and arranged to move them simultaneously toward each other into clamping position and from each other into releasing position, said means being arranged to lock the sides releasably in said clamping position.

7. In a device of the kind described, a cradle base forming a rest for an article to be clamped, cradle sides supported to move toward and from the base to form article clamping members, and a camming device having operative connection with the cradle sides and movable to effect movement of the sides toward and from the cradle base.

8. In a device of the kind described, a cradle base forming a rest for an article to be clamped, guide members extending laterally of said cradle base, cradle sides mounted on said guide members to slide toward and from each other and constituting article clamping means, and a camming device having operative connection with the cradle sides and movable to effect simultaneous movement of the sides toward and from the longitudinal center line of the base.

9. In a device of the kind described, a cradle base forming a rest for an article to be clamped, cradle sides supported to move toward and from the base to form article clamping and locking members, and a camming device having operative connection with the cradle sides and movable to effect movement of the sides toward and from the cradle base, said camming device including a dwell portion operable to hold the sides in article clamping and locking positions.

10. In a device of the kind described, a cradle base forming a rest for an article to be clamped, guide members extending laterally of said cradle base, cradle sides mounted on said guide members to slide toward and from each other and constituting article clamping and locking means, and a camming device having operative connection with the cradle sides and movable to effect simultaneous movement of the sides toward and from the longitudinal center line of the base, said camming device including a dwell portion operable to hold the sides in article clamping and locking positions.

11. In a device of the kind described, a cradle base forming a rest for an article to be clamped, cradle sides supported to move toward and from the base to form article clamping and locking means, and a cam plate having operative connection with said sides and mounted to move longitudinally of the cradle sides and cause said sides to move into and out of article clamping and locking positions.

12. In a device of the kind described, a cradle base forming a rest for an article to be clamped, cradle sides supported to move toward and from the base to form article clamping and locking means, and a cam plate having operative connection with said sides and mounted to move longitudinally of the cradle sides and cause said sides to move into and out of article clamping and locking positions, said cam plate having a dwell portion operable to lock the sides in clamping position.

13. In a device of the kind described, a cradle base forming a rest for an article to be clamped, cradle sides supported to move toward and from the base to form article clamping and locking means, and a cam plate having operative connection with said sides and mounted to move longitudinally of the cradle sides and cause said sides to move into and out of article clamping position, and an operating lever fulcrumed on the cradle base and connected to the cam plate to move the same.

14. In a device of the kind described, a cradle base forming a rest for an article to be clamped, and locked thereon, cradle sides supported to move toward and from the base to form article clamping and locking means, a cam plate having operative connection with said sides and mounted to move longitudinally of the cradle sides and cause said sides to move into and out of article clamping and locking position, said cam plate having a dwell portion operable to hold the sides in clamping and locking position, and an operating lever fulcrumed on the cradle base and connected to the cam plate to move the same.

15. In a device of the kind described, a cradle base forming a rest for an article to be clamped and locked thereon, guides extending transversely of said base, cradle sides slidably mounted on said guides to move toward each other to clamp and lock an article and from each other to release the same, and a cam plate mounted on said base to slide longitudinally thereof and having operative connection with said sides to move the sides toward each other when moved in one direction and from each other when moved in the opposite direction.

16. In a device of the kind described, a cradle base forming a rest for an article to be clamped and locked thereon, guides extending transversely of said base, cradle sides slidably mounted on said guides to move toward each other to clamp an article and from each other to release the same, and a cam plate mounted on said base to slide longitudinally thereof and having operative connection with said sides to move the sides toward each other when moved in one direction and from each other when moved in the opposite direction, said cam plate having a dwell portion operable to hold the sides in clamping and locking positions.

17. In a device of the kind described, a cradle base forming a rest for an article to be clamped, guides extending transversely of said base, cradle sides slidably mounted on said guides to move toward each other to clamp and lock an article on said cradle base, and from each other to release the same, a cam plate mounted on said base to slide longitudinally thereof and having operative connection with said sides to move the sides toward each other when moved in one direction and from each other when moved in the opposite direction, and an operating lever fulcrumed on the cradle base and connected to the cam plate to move the same.

18. In a device of the kind described, a cradle base forming a rest for an article to be clamped and locked thereon, guides extending transversely of said base, cradle sides slidably mounted on said guides to move toward each other to clamp and lock an article on said cradle base and from each other to release the same, a cam plate mounted on said base to slide longitudinally thereof and having operative connection with said sides to move the sides toward each other when moved in one direction and from each other when moved in the opposite direction, and an operating lever fulcrumed on the cradle base and connected to the cam plate to move the same.

19. In a device of the kind described, a cradle base forming a rest for an article to be clamped and locked thereon, guide pins projecting laterally from the side edges of said base, cradle sides having apertures receiving said pins to permit sliding movement of the sides toward and from the base, transverse members extending from each side toward the other side, cam pins projecting from said transverse members, a cam plate having diverging pairs of slots and receiving said cam pins, said plate being mounted on the base for movement longitudinally thereof, said slots being so arranged that movement of the cam plate in one direction effects movement of the said sides toward each other and movement of the plate in the other direction effects movement of the sides from each other, said slots having parallel extensions forming dwells and receiving the cam pins upon the sides being in clamping position to effect a locking action, and means to move said cam plate.

20. In a device of the kind described, a cradle base forming a rest for an article to be clamped and locked thereon, cradle sides movable laterally towards and from said cradle base, transverse members extending from each side towards the other side, cam pins projecting from said transverse members, a cam plate having diverging pairs of cam slots and receiving said cam pins, said plate being mounted on the base for movement longitudinally thereof, the slots being so arranged that movement of the cam plate in one direction effects movement of the sides towards each other to clamp the article on the cradle base, and movement of the plate in the other direction effects movement of the sides from each other to unclamp the article, said slots having parallel extensions forming dwells and receiving the cam pins upon the sides being in clamping position to effect a locking action, and means to move said cam plate.

21. In a device of the kind described, a cradle base forming a rest for an article to be clamped and locked thereon, cradle sides movable laterally towards and from said cradle base, transverse members extending from each cradle side towards the other side and forming adjacent pairs of transverse members, cam pins projecting from each member of said pair of transverse members, the pins of each pair being offset with respect to each other longitudinally of the cradle base, a cam plate having diverging pairs of slots and receiving said pins, and continuous therewith parallel extensions forming dwells, the latter being offset to correspond with the pin offsets, whereby upon the cam plate being moved in one direction the sides of the cradle are preliminarily brought into a clamping position and upon further movement as the cam pins enter the dwell portions into a locking position, and upon reverse movement of the cam plate, into an unlocking and unclamping position, and means to move said cam plate.

22. In a device of the kind described a universal joint including a clamping ring, a segmental spherical member held in said ring, spaced bearings supported on said member, a shaft supported in said bearings with its axis intersecting the axis of the ring at right angles thereto, and an article supporting device mounted on the shaft.

23. In a device of the kind described, tripod supporting means having legs provided with mud shoes at their lower ends, each mud shoe comprising in combination a flange member, a locking plate pivotally mounted on the tripod leg, and slots in said flange member adapted to receive the locking plate.

24. In a device of the character described, a cradle base forming a rest for an article to be clamped, guide members, cradle sides forming article clamping and locking members mounted on said guide members and movable laterally toward and from said base, and means to move said side members relative to the guide members into and out of gun clamping and locking positions.

25. A machine gun support including a cradle base forming a rest for the gun, guide members, cradle sides forming gun clamping and locking members mounted on said guide members and movable laterally toward and from said base, and means to move said side members relative to said guide members into and out of gun clamping and locking positions.

26. In a device of the kind described, a cradle base forming a rest for an article to be clamped, cradle sides forming article clamping and locking members and movable laterally toward and from said base, means to simultaneously move said cradle sides into clamping position and from each other into releasing position, said means being arranged to lock the sides releasably in said clamping position.

27. A machine gun support including a cradle base forming a rest for a gun, cradle sides forming gun clamping and locking members and movable laterally toward and from said base, means to simultaneously move said cradle sides into clamping position and from each other into releasing position, said means being arranged to lock the sides releasably in said clamping position.

28. In a device of the kind described, a cradle base forming a rest for an article to be clamped, guide members, cradle sides mounted on said guide members to slide toward and from each other and constituting article clamping means, and means having operative connection with the cradle sides and movable to effect simultaneous movement of the sides toward and from the longitudinal center line of the base.

29. In device of the kind described, a cradle base forming a rest for an article to be clamped, cradle sides adjacent the base mounted to slide toward and from each other and constituting article clamping and locking means, means having operative connection with the cradle sides and movable to effect simultaneous movement of the sides toward and from the base, and means to hold the cradle sides in article clamping and locking positions.

GREENHOW JOHNSTON.